H. C. BASTER.
LOOSE LEAF FILING SYSTEM OR POSTING TRAY.
APPLICATION FILED NOV. 28, 1917.
1,389,116.
Patented Aug. 30, 1921.
4 SHEETS—SHEET 1.
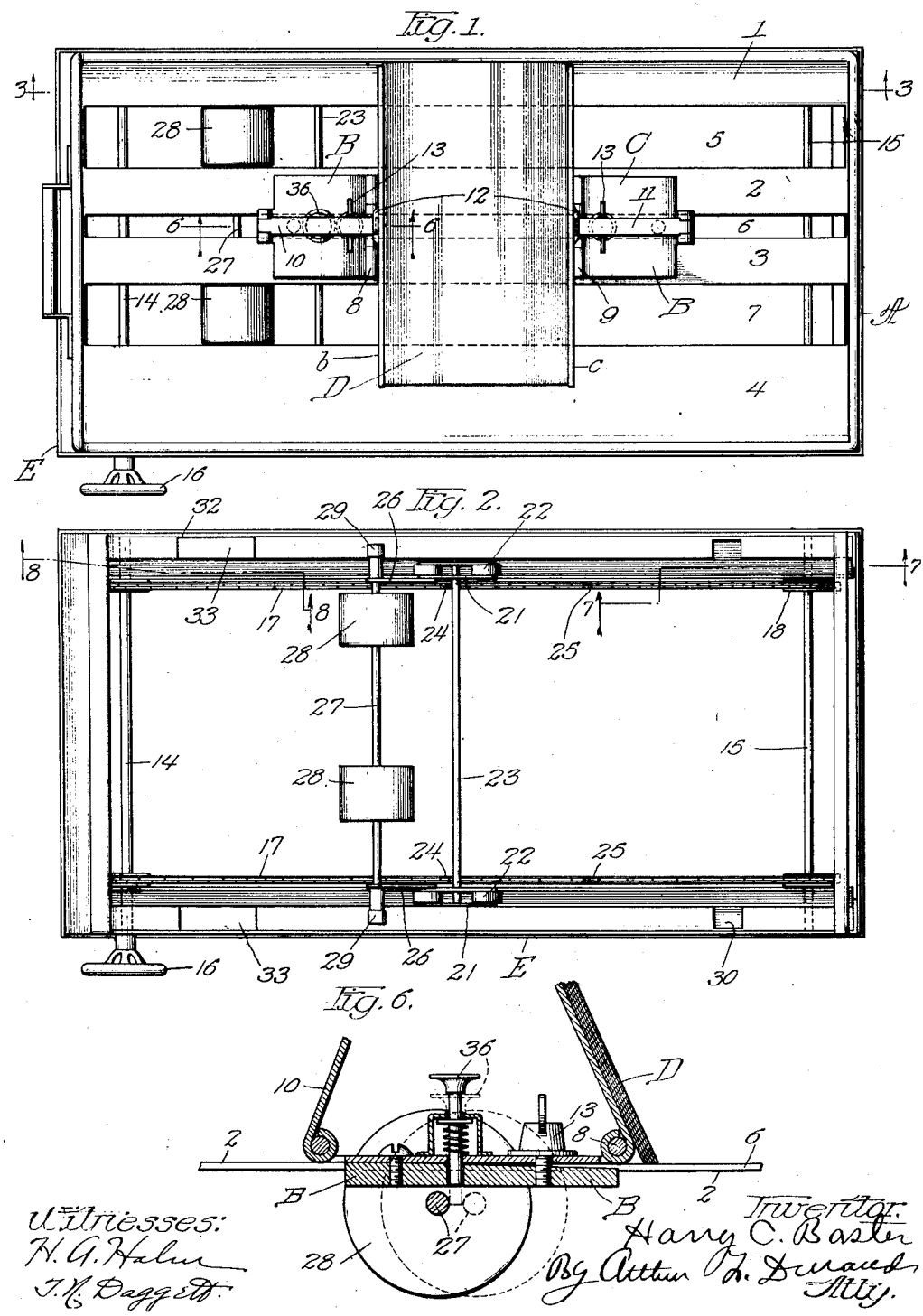

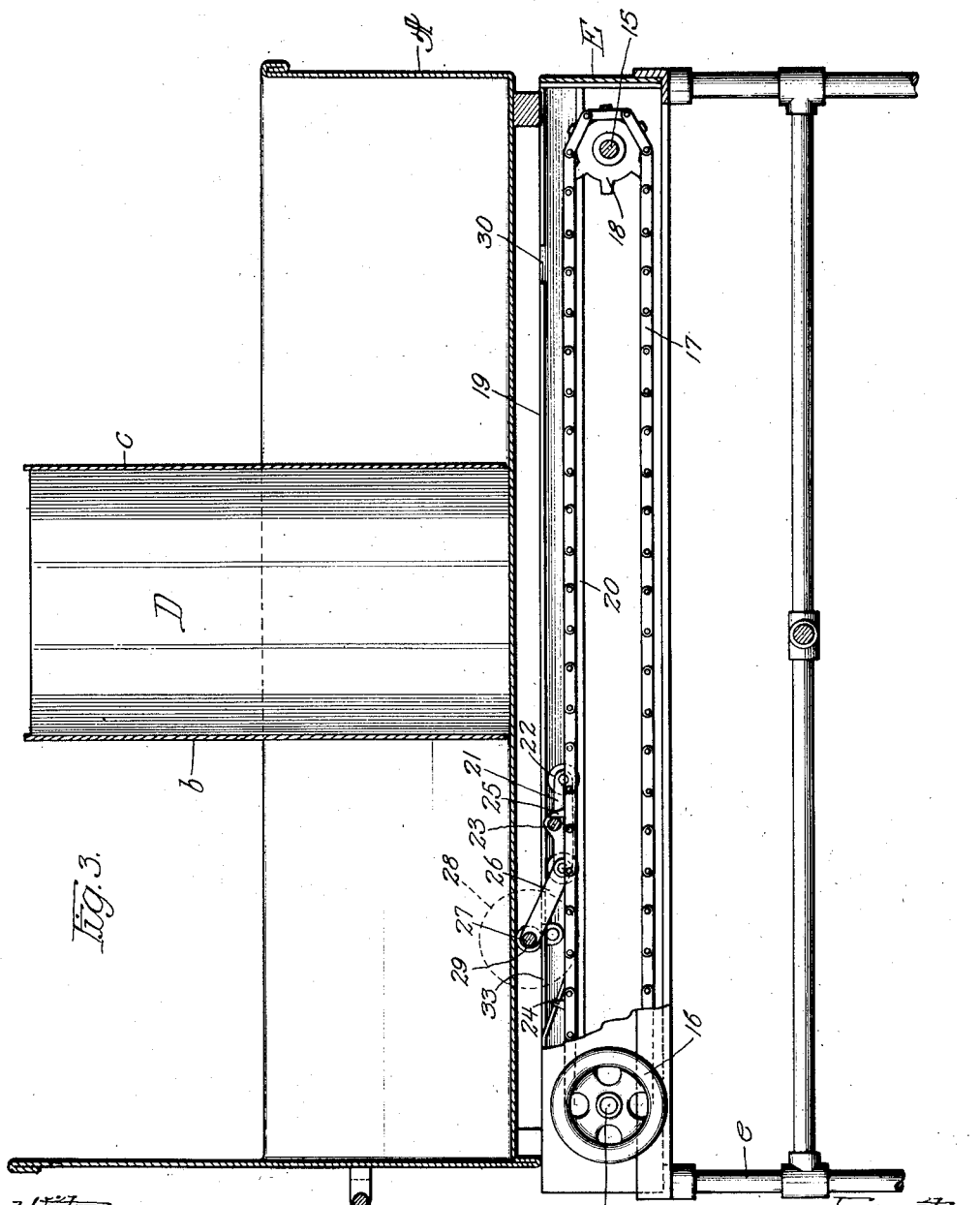

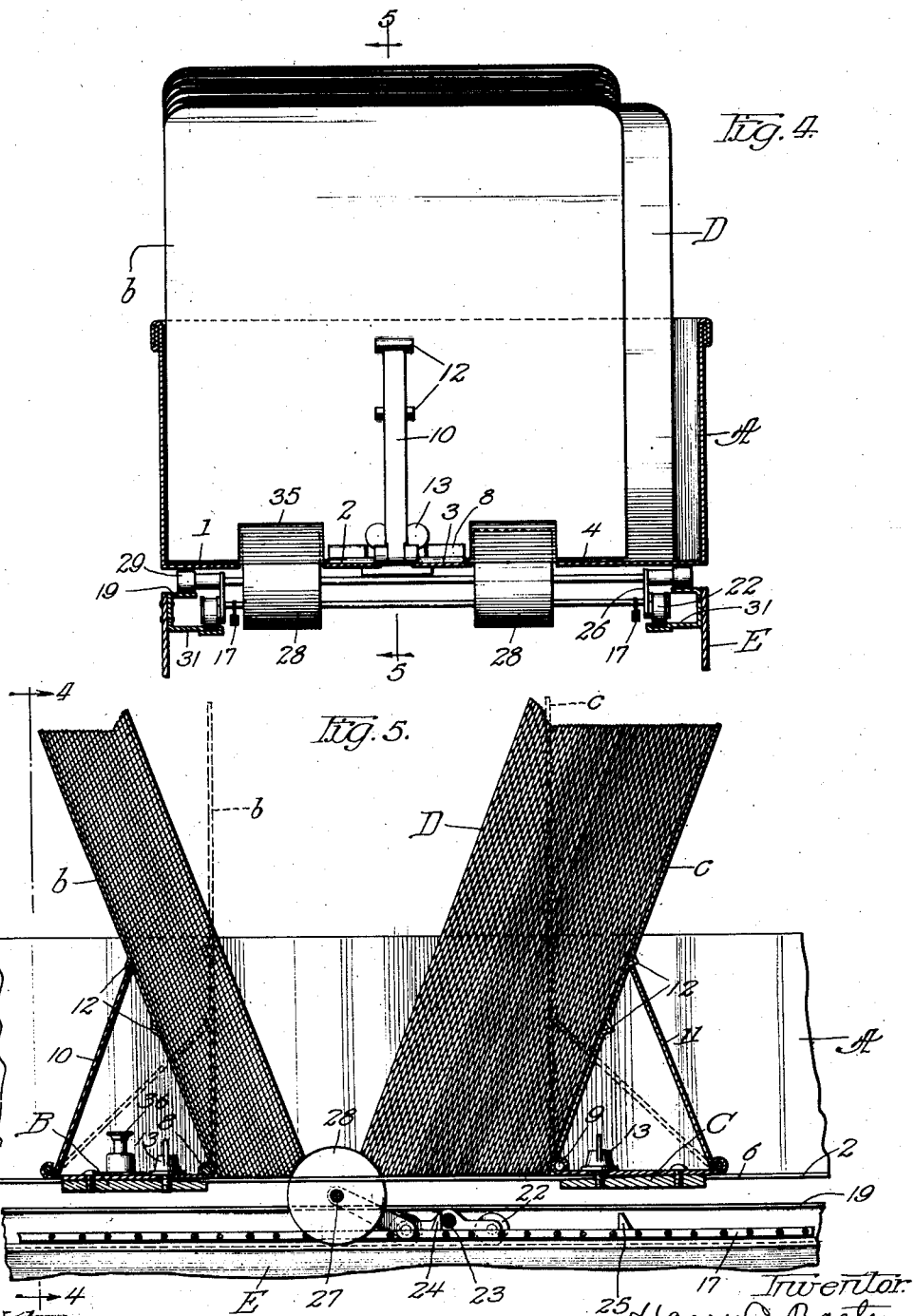

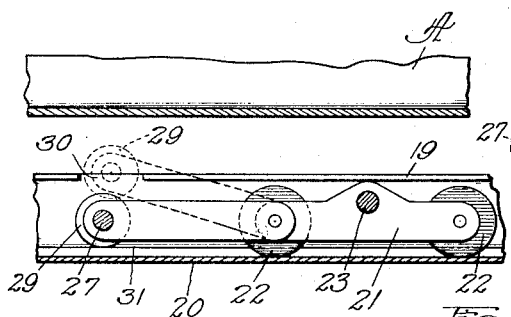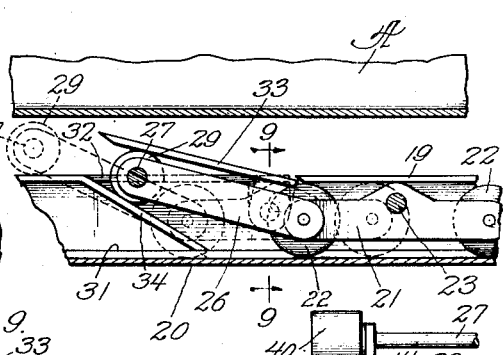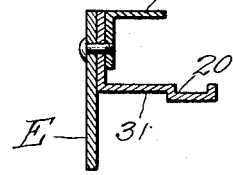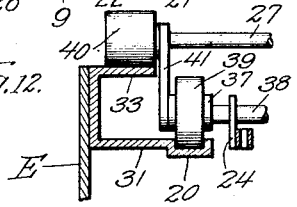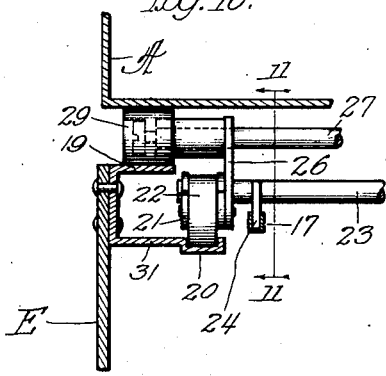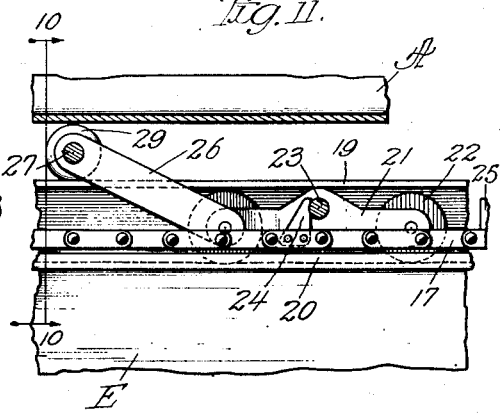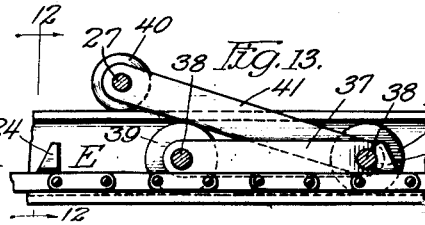

UNITED STATES PATENT OFFICE.

HARRY C. BASTER, OF BENTON HARBOR, MICHIGAN.

LOOSE-LEAF FILING SYSTEM OR POSTING-TRAY.

1,389,116.　　　　　Specification of Letters Patent.　　Patented Aug. 30, 1921.

Application filed November 28, 1917. Serial No. 204,334.

*To all whom it may concern:*

Be it known that I, HARRY C. BASTER, a citizen of the United States of America, and resident of Benton Harbor, county of Berrien, and State of Michigan, have invented a certain new and useful Improvement in Loose-Leaf Filing Systems or Posting-Trays, of which the following is a specification.

This invention relates to loose-leaf filing systems in general, but more particularly to what is commonly known as a posting-tray, which latter is usually in the form of a drawer or box-like receptacle for containing the leaves upon which entries are made, and which is ordinarily placed upon a table or stand at the side of the operator, so that the leaves can be removed from the tray and placed in the posting-machine, and then returned to the tray after the entries are made thereon, in the usual and well-known manner.

Generally stated, the object of the invention is to provide novel and improved means for elevating or upsetting some of the leaves or sheets or cards in the drawer or tray, so that their edges will be slightly elevated and held in such position that they can be easily manipulated by the operator who is using the posting-machine, when the invention is embodied in a posting-tray, or by any other person when the invention is used for any other suitable or desired purpose.

A special object is to provide a lifting or upsetting device which can be moved back and forth below the leaves or sheets or cards in the drawer or posting-tray, thereby facilitating the manipulation and selection and removal of the leaves or sheets and making it easy to shift or turn them over one at a time, so that the person using the system or apparatus may go rapidly through the leaves or sheets or cards, turning them over quickly one by one, and whereby the annoyance and difficulty usually experienced in working with systems or devices of this character is practically avoided.

It is also an object to provide certain details and features of construction and combinations tending to increase the general efficiency and desirability of a loose-leaf filing system and posting-tray apparatus of this particular character.

To these and other useful ends, this invention consists in matters hereinafter set forth and claimed.

In the accompanying drawings:

Figure 1 is a plan of a loose-leaf filing system and posting-tray apparatus embodying the principles of this invention, showing the drawer containing the loose leaves or sheets or cards in position on the table or stand having the means for elevating some of the leaves or sheets above the others.

Fig. 2 is a similar view, but showing the drawer removed.

Fig. 3 is a longitudinal vertical section on line 3—3 in Fig. 1, on a larger scale.

Fig. 4 is a transverse section on line 4—4 in Fig. 5, showing the structure on a larger scale than in Figs. 1, 2 and 3.

Fig. 5 is a vertical section on line 5—5 in Fig. 4.

Fig. 6 is an enlarged vertical detail section on line 6—6 in Fig. 1.

Fig. 7 is an enlarged detail sectional view on line 7—7 in Fig. 2.

Fig. 8 is a similar detail sectional view on line 8—8 in Fig. 2.

Fig. 9 is a detail cross-section on line 9—9 in Fig. 8.

Fig. 10 is a detail transverse section on line 10—10 in Fig. 11.

Fig. 11 is a detail longitudinal section on line 11—11 in Fig. 10.

Figs. 12 and 13 are detail views showing another form of the invention, Fig. 12 being a vertical section on line 12—12 in Fig. 13, and Fig. 13 being a view similar to Fig. 11.

As thus illustrated, this invention comprises a tray or drawer A, of any suitable character, having its bottom provided with longitudinal strips 1, 2, 3 and 4, forming a bottom wall having longitudinal slots 5, 6 and 7, which extend from one end to the other of said drawer. This drawer may be constructed in any suitable or desired manner, to enter an ordinary filing cabinet, and is provided with front and rear slides B and C, which slide back and forth in the slot 6 and which are provided with the front and rear upright walls *b* and *c*, these walls being preferably inclined away from each other and hinged to said slides at 8 and 9 at their lower edges. Said slides also have hinged props 10 and 11 for engaging the projections 12 formed on the backs of said walls, so that the latter can be held either in vertical position or in an inclined position; for, when the leaves or sheets D are not in use, and the drawer in the cabinet, the walls *b* and *c* are preferably upright, (see Fig. 3) but while the apparatus is in use the two walls are preferably held in inclined positions (see Fig. 5) so that the leaves or sheets or cards D can be turned over or shifted from one side to the other in the usual well-known manner. Thumb-screws 13 are provided on said slides to securely hold them in any adjusted position along the slot 6, depending upon the quantity of sheets or leaves held in the drawer or tray.

The table or stand upon which the tray is placed after it is removed from the case, in order to facilitate manipulation of the leaves or sheets, is as follows:—The rectangular body frame E, of any suitable character, is preferably supported at the proper or desired height by table legs e of tubing or of any suitable construction. Transverse shafts 14 and 15 are mounted in suitable bearings at opposite ends of said frame, and the shaft 14 is provided at its outer end with a hand-wheel 16 by which it can be rotated. The sprocket chains 17 are spaced apart and arranged parallel with the sides of the frame, and are carried on sprocket wheels 18 on said shafts.

The sides of the frame are provided with upper tracks 19, and with lower tracks 20, (see Figs. 9 and 10) sheet metal being preferably employed for this construction, in the manner shown. Travelers 21, having wheels 22, are suitably arranged to travel on the tracks 20, and are connected together by a transverse rod 23, which latter is adapted to be engaged by either one of the two upright engaging elements 24 and 25 on each sprocket chain, these elements being spaced apart in the manner shown (see Fig. 3). Links 26 are pivotally secured to the forward ends of the carriers 21, and these two links are connected together by a transverse shaft 27 upon which are mounted rollers or wheels 28 that extend through the slots 5 and 7 in the bottom of the cabinet-drawer. Also, the opposite ends of the rod or shaft 27 are provided with rollers or wheels 29 which travel on the tracks 19, the latter being provided near their rear ends with openings 30 through which these wheels or rollers 29 may drop downward upon the tracks 31 below. In addition, it will be seen that the tracks 19 have openings 32 which are normally closed by the pivoted track sections 33, and with inclines 34 below said pivoted track sections. Thus, when the sprocket chains 17 are operated in one direction, the rollers or wheels 29 drop through the openings 30 upon the tracks 31, and when the motion of the sprocket chains is reversed these rollers or wheels finally engage the inclines 34 and raise the pivoted track sections 33 and finally reach the tops of the tracks 19 (see Fig. 8), so that the sprocket chains can again be reversed to carry the rollers 28 toward the rear end of the drawer. The walls b and c have notches 35 in their lower edges, for the wheels or rollers 28, so that when the latter are operated toward the rear end of the drawer (which is toward the openings 30) said wheels or rollers ride under the leaves or sheets and move them upward, in the manner shown. (See Fig. 5.) This movement of the rollers is accomplished by the engagement of the elements 24 with the rod 23, and when the movement of the sprocket chains is reversed the elements 25 thereafter engage said rod and bring the rollers 28 back toward the front end of the drawer; but this reverse movement, it will be seen, involves the passage of the rollers or wheels 29 along the tracks 31, so that at this time the rollers 28 are depressed below the lower edges of the leaves or sheets, thus permitting the return of the apparatus to normal position. The slide B is provided with a spring-held pin 36, which can be depressed to engage the rod 27 (see Fig. 6), so that by turning the hand-wheel 16 the slide B can be moved toward the slide C, thereby compressing the leaves or sheets between the two walls b and c, in a manner that will be readily understood; and it will also be understood that for this purpose the thumb-screw 13 on the slide B is first loosened, and after the leaves or sheets are brought tightly together (see Figs. 1 and 3) this thumb-screw is then tightened again.

It will be seen that the leaves or sheets, and also the walls b and c, are preferably not as wide as the drawer, so that some of the leaves or sheets can be displaced sidewise from the others, (see Fig. 4) thus, in effect, segregating any one or more of the leaves or sheets from the others. When the rollers 28 are moved under the leaves or sheets (see Fig. 5), some of the leaves or sheets are elevated in the manner shown, thus bringing their upper edges above the flush or even edges of the other leaves or sheets. The leaves or sheets thus brought into elevated position can be easily manipulated, as their upper edges stand out sharply above the edges of the other sheets or leaves, and these elevated leaves or sheets or cards can be rapidly turned over or shifted one by one from one section of the group to the other, in a manner that will be readily understood. The rollers 28 can be shifted to a different position, if the user of the apparatus desires to examine the leaves or the sheets at another point in the mass or collection of cards or sheets, and in this way, the particular leaves or sheets being manipulated can always be maintained a little higher than the others, thereby making it easier for the user of the apparatus to go rapidly through the entire contents of the drawer or tray or other receptacle.

It will be seen that the upstanding teeth or engaging elements 24 and 25, and the transverse rod 23, constitute a lost motion connection between the rollers 28 and the operating mechanism, so that the latter can be operated to some extent in either direction before moving the rollers, which is found to be preferable and advantageous in practice. Also, the pin 36 can be depressed to engage either side of the shaft or rod 27, and in this way the wall $b$ can be moved either toward or away from the wall $c$, in accordance with the requirements of the work. Again, by loosening both thumb-screws 13, the pin 36 and the shaft 27 can be brought into engagement with each other to shift the entire mass or pack of leaves or sheets or cards together and toward the other end of the drawer. In other words, the operating mechanism can be used for shifting the contents of the drawer longitudinally thereof.

With the foregoing construction, it will be seen that the manipulation and inspection of the leaves or sheets or cards is greatly facilitated, for when a few of these thin sheets are elevated, the upper edges thereof are brought above the flush upper edges of the other sheets or cards and the operator can easily separate the sheets one by one and shift them over from one division of the pack to the other. In this way, the particular leaves or sheets or cards which are under inspection, or which are being manipulated, can be kept higher than the others so that the leaf or sheet which is facing outward and which is next in order to be turned over will always have its upper edge a little higher than the others, and thus be in readiness to be easily engaged at its upper edge and shifted over to the other side of the gap formed in the pack or bundle of sheets, whereby the leaves or sheets can be readily and successively removed and replaced at any point in the contents of the drawer or tray or other receptacle.

From the foregoing it will be seen that the lifting or upsetting device facilitates the manipulation or handling, and the selection and removal as well, of the leaves or sheets or cards in the drawer or posting-tray. Referring to Fig. 5, it will be seen, for example, that without the roller 28, and with the leaves or sheets separated into two groups for manipulation, the different leaves or sheets or cards would slide around and separate and become displaced in a manner which would cause them to sag and get out of position, and at times the leaves or sheets would, in fact, become entirely unmanageable, thus causing considerable annoyance and trouble. However, with the roller 28 in position between the two divisions or groups or sheets, each group is retained in upright position, and the leaves of each group are held tightly together, for with this roller in position the two groups cannot slide toward each other at their lower edges. When the two walls $c$ and $b$ are moved apart far enough to facilitate the manipulation and selection and removal of the leaves, and are adjusted into their inclined positions, the leaves or sheets have a tendency to slide and fall down, and to thus interfere with the desired work; but, with the lifting or upsetting device shown and described, including the roller 28 which is movable back and forth below the contents of the drawer or posting-tray, this difficulty or trouble is very greatly reduced and practically avoided, for the leaves or sheets are always braced and held tightly together by the roller, and are prevented from sliding around or falling down; and, of course, this is true regardless of the position of the roller, for it can be moved back and forth below the leaves or sheets to insure the desired retention or upholding of the latter at any point lengthwise of the drawer or tray. Removal and insertion of the leaves and sheets is, in this way, facilitated and made easy, and the life of the leaves or sheets is extended, for with the invention shown and described the leaves or sheets are prevented from sagging and getting out of shape and are maintained in good condition. The cylindric surface of the roller causes the upper edge of each leaf or sheet to be a little higher than the one immediately behind, so that the operator or other person can easily finger or manipulate the leaves at their upper edges, and the roller separates the posted from the unposted leaves, and the return of the leaves is made easy and is not accompanied by any sagging or binding. As soon as the leaves which have been lifted or upset by the roller 28 are all posted, the roller is then moved along a little farther, and in this way the work progresses in a step by step manner until the back or rear end of the drawer or tray is reached.

In Figs. 12 and 13 the two sides of the traveler 37 (corresponding to the traveler 21, previously described) are connected together by the two rods 38 upon which the wheels 39 are mounted, so that the center rod 23 of the previously described construction is omitted. Also, as shown in Figs. 12 and 13, the rollers 40, which correspond to the rollers 29, previously described, are connected by links 41 with the other end of the traveler, instead of to the adjacent end thereof, as shown in Fig. 11, so that the entire traveling device is shorter than the one shown in Fig. 11; and, in addition, the two upstanding elements 24 and 25 on the sprocket chains engage the rods 38, so that one element will push on one end of the traveler, and the other element will push on the other end of the traveler, instead of upon the center rod 23 shown in the previously described construction. Preferably, the construction is such that the traveler can be pushed over the sprocket wheels at either the front or rear end of the tray or drawer, whereby the lifting or upsetting roller 28 can be given a sufficient range of movement to accomplish the desired results. In Figs. 12 and 13 there is, however, preferably some lost-motion between the traveler and the sprocket chains, by reason of the distance between the elements 24 and 25, so that while the apparatus is in use the sprocket chains can be adjusted until the traveler is about midway between the elements 24 and 25, and in this way slight movement of the sprocket chain, by accidental turning of the hand-wheel, will not disturb the lifting or upsetting roller 28, and will not disturb the leaves or sheets or cards. It will be understood, of course, that the elements 24 and 25 are so located on the sprocket chains that the latter are free to travel around the sprocket wheels at the points where these engaging or pushing elements are attached to each chain.

It will be understood, of course, that the invention is not limited to any particular use or purpose, and that the invention may be used in various forms for different purposes, and that various changes can be made in the details of the construction without departing from the spirit of the invention, as the invention is not limited to the exact construction shown and described.

What I claim as my invention is:

1. The combination of a receptacle consisting of a filing drawer for holding leaves or sheets or cards in a more or less upright position, with their upper edges substantially even or flush, a table on which the drawer is adapted to be supported, means on said table to engage the lower edges of said leaves or sheets or cards, and instrumentalities whereby said means is movable into position to raise any of said leaves or sheets or cards to bring the upper edges thereof above the others.

2. A structure as specified in claim 1, said means including a roller having a horizontal axis of rotation, and said instrumentalities including devices to move said roller back and forth below the group of leaves or sheets or cards in said receptacle.

3. A structure as specified in claim 1, said instrumentalities including sprocket chains and parallel tracks for controlling the back and forth movements of said means.

4. A structure as specified in claim 1, said means including a roller having a horizontal axis of rotation, and said instrumentalities including parallel tracks for supporting the axis of said roller in one horizontal plane while moving toward one end of the receptacle and other tracks which support said axis in a lower horizontal plane while moving toward the other end of the receptacle.

5. A structure as specified in claim 1, and means operated by certain elements of said instrumentalities to compress the leaves or sheets or cards together.

6. A structure as specified in claim 1, and means operated by certain of said instrumentalities to shift the leaves or sheets or cards horizontally and longitudinally of said receptacle.

7. A structure as specified in claim 1, said receptacle having walls to embrace the leaves or sheets or cards, and means operated by certain of said instrumentalities to move one of said walls either toward or away from the other.

8. A structure as specified in claim 1, said receptacle having a longitudinal slot in the bottom thereof, and said means including a roller movable in said slot.

9. The combination of a drawer containing leaves or sheets or cards arranged with their upper edges substantially flush, having means whereby the leaves or sheets or cards may be supported in a compact body or spread apart to facilitate inspection thereof, a table to support said drawer, a member movable along the top of said table to elevate any of said leaves or sheets or cards above the others, mechanism on said table to move said member back and forth below said drawer, and guides for said member.

10. A structure as specified in claim 9, said guides having openings to permit said member to fall to a lower level at the end of its movement in one direction, and having openings and pivoted track-sections to permit said member to rise to a higher level at the end of its movement in the opposite direction, and to then move forward in its upper plane of movement.

11. A structure as specified in claim 9, said mechanism having a lost-motion connection with said member.

12. The combination of a receptacle for holding leaves or sheets or cards in a more or less upright position, with their upper edges substantially even or flush, means to engage the lower edges of said leaves or sheets or cards, and instrumentalities whereby said means is movable into position to raise any of said leaves or sheets or cards to bring the upper edges thereof above the others, said means including a roller having a horizontal axis of rotation, and said instrumentalities including devices to move said roller back and forth below the group of leaves or sheets or cards in said receptacle.

13. The combination of a receptacle for holding leaves or sheets or cards in a more or less upright position, with their upper edges substantially even or flush, means to engage the lower edges of said leaves or sheets or cards, and instrumentalities whereby said means is movable into position to raise any of said leaves or sheets or cards to bring the upper edges thereof above the others, said instrumentalities including sprocket chains and parallel tracks for controlling the back and forth movements of said means.

14. The combination of a receptacle for holding leaves or sheets or cards in a more or less upright position, with their upper edges substantially even or flush, means to engage the lower edges of said leaves or sheets or cards, instrumentalities whereby said means is movable into position to raise any of said leaves or sheets or cards to bring the upper edges thereof above the others, and means operated by certain elements of said instrumentalities to compress the leaves or sheets or cards together.

15. The combination of a receptacle for holding leaves or sheets or cards in a more or less upright position, with their upper edges substantially even or flush, means to engage the lower edges of said leaves or sheets or cards, instrumentalities whereby said means is movable into position to raise any of said leaves or sheets or cards to bring the upper edges thereof above the others, and means operated by certain of said instrumentalities to shift the leaves or sheets or cards horizontally and longitudinally of said receptacle.

16. The combination of a receptacle for holding leaves or sheets or cards in a more or less upright position, with their upper edges substantially even or flush, means to engage the lower edges of said leaves or sheets or cards, instrumentalities whereby said means is movable into position to raise any of said leaves or sheets or cards to bring the upper edges thereof above the others, said receptacle having walls to embrace the leaves or sheets or cards, and means operated by certain of said instrumentalities to move one of said walls either toward or away from the other.

17. The combination of a receptacle for holding leaves or sheets or cards in a more or less upright position, with their upper edges substantially even or flush, means to engage the lower edges of said leaves or sheets or cards, and instrumentalities whereby said means is movable into position to raise any of said leaves or sheets or cards to bring the upper edges thereof above the others, said receptacle having a longitudinal slot in the bottom thereof, and said means including a roller movable in said slot.

18. The combination of a receptacle for holding leaves or sheets or cards in a more or less upright position, with their upper edges substantially even or flush, means to engage the lower edges of said leaves or sheets or cards, and instrumentalities whereby said means is movable into position to raise any of said leaves or sheets or cards to bring the upper edges thereof above the others, said means including a roller having a horizontal axis of rotation, and said instrumentalities including parallel tracks for supporting the axis of said roller in one horizontal plane while moving toward one end of the receptacle and other tracks which support said axis in a lower horizontal plane while moving toward the other end of the receptacle.

19. In a device of the class described, means for supporting a filing drawer thereon, and means associated with said means for upsetting leaves in said drawer when the drawer is supported on the first named means.

20. A structure as specified in claim 19, said last mentioned means comprising a roller for engaging the lower edges of the leaves, sprocket chains for moving the roller back and forth horizontally, and guides for controlling the roller.

21. A structure as specified in claim 19, said first mentioned means comprising a table from which the drawer is removable after inspection of the leaves, so that the drawer may be returned to its case.

Signed by me at Benton Harbor, Michigan, this 22 day of November, 1917.

HARRY C. BASTER.